US007827935B1

(12) United States Patent  (10) Patent No.: US 7,827,935 B1
Addleman  (45) Date of Patent: Nov. 9, 2010

(54) RESTRICTED ACCESS ANIMAL FEEDER UTILIZING VIBRATORY MEANS TO DETER ACCESS TO FOOD

(76) Inventor: Rachel Addleman, 7602 Oak Fern, Houston, TX (US) 77040

( * ) Notice: Subject to any disclaimer, the term of this patent is extended or adjusted under 35 U.S.C. 154(b) by 192 days.

(21) Appl. No.: 12/319,608

(22) Filed: Jan. 8, 2009

Related U.S. Application Data

(60) Provisional application No. 61/066,240, filed on Feb. 19, 2008.

(51) Int. Cl.
*A01K 1/10* (2006.01)
*A01K 5/00* (2006.01)
*A01K 37/00* (2006.01)

(52) U.S. Cl. .................. 119/51.02; 119/59; 119/63; 119/719; 119/865

(58) Field of Classification Search ........... 119/712, 119/719, 51.02, 59, 63, 865
See application file for complete search history.

(56) References Cited

U.S. PATENT DOCUMENTS

| 3,176,656 | A | * | 4/1965 | Bates ............................ 119/62 |
| 4,426,955 | A | * | 1/1984 | Monroe et al. ............ 119/51.02 |
| 4,655,170 | A | | 4/1987 | DaSilva |
| 5,570,655 | A | | 11/1996 | Targa |
| 5,669,328 | A | | 9/1997 | Lanfranchi |
| 6,044,795 | A | | 4/2000 | Matsuura |
| 6,349,671 | B1 | | 2/2002 | Lewis et al. |
| 6,622,656 | B1 | * | 9/2003 | Splane ......................... 119/62 |
| 6,651,584 | B2 | | 11/2003 | van den Berg |
| 6,907,843 | B2 | | 6/2005 | van den Berg |
| 7,051,674 | B2 | | 5/2006 | van den Berg |
| 7,100,534 | B2 | | 9/2006 | van den Berg |
| 7,124,707 | B1 | * | 10/2006 | Clarke ..................... 119/51.02 |
| 7,395,782 | B1 | * | 7/2008 | Lindsay .................... 119/51.02 |
| 2002/0134313 | A1 | * | 9/2002 | Andrew King et al. .... 119/51.02 |
| 2005/0061252 | A1 | | 3/2005 | Meeks et al. |
| 2005/0217591 | A1 | | 10/2005 | Turner |
| 2006/0249088 | A1 | * | 11/2006 | Eu ............................ 119/51.02 |
| 2007/0125306 | A1 | * | 6/2007 | Beecher ................... 119/51.02 |
| 2007/0144446 | A1 | * | 6/2007 | Neckel ..................... 119/51.02 |
| 2008/0314334 | A1 | * | 12/2008 | Dalton ....................... 119/719 |

* cited by examiner

*Primary Examiner*—Timothy D Collins
*Assistant Examiner*—Joshua Huson
(74) *Attorney, Agent, or Firm*—Thomas I. Rozsa (57) ABSTRACT

A restricted animal access feeder which includes the concept of having vibratory means and noise emitting means which will scare an animal away from eating food in a desired dish. The vibratory means and noise emitting means are generated by closing of a magnetic circuit so that the vibratory mechanism and noise activating mechanism is activated. An animal who is desired not to eat from a specific food dish will wear a specific magnetic collar that will close the activation circuit. An animal that does not have such collar will not close the activation circuit and therefore, will have access to the food. The invention also includes means to enable the magnet to detach from a magnetic object so that the animal will not be permanently attached to a magnetic object such as a refrigerator.

15 Claims, 6 Drawing Sheets

RESTRICTED ACCESS ANIMAL FEEDER UTILIZING VIBRATORY MEANS TO DETER ACCESS TO FOOD

CROSS-REFERENCE TO RELATED APPLICATIONS

The present invention claims benefit to U.S. Provisional Application 61/066,240 filed on Feb. 19, 2008, the disclosure of which is incorporated by reference.

BACKGROUND OF THE INVENTION

1. Field of the Invention

This invention relates to restriction of access to food by animals, and, more particularly, to the mechanical restriction of access to food for small domesticated pets.

2. Description of the Prior Art

Pet owners are more conscious of the dietary needs of their pets. Whether it is by doctor's orders or by the initiative of the owner, more and more pet owners have the need to control the diet of their pets. When there are more than one pet in the home, a frequent problem is that one pet tends to also eat another's food. Whether the issue is preventing an overweight pet from eating the other's food or to ensure that one pet is getting all its allotment of its special diet, a need exists in the home to ensure that this occurs.

Controlled animal feeders are well known in the art and tend to fall into one of two categories, those pertaining to livestock and those pertaining to household pets. Of those pertaining to household pets, most employ complicated circuits using microprocessors and transmitters.

The following 14 patents and published patent applications are relevant to the field of the present invention.

1. U.S. Pat. No. 4,426,955 issued to Marvin E. Monroe et al. and assigned to Optek, Inc. on Jan. 24, 1984 for "Identification And Animal Feeding Apparatus" (hereafter the "Monroe Patent");

The Monroe Patent is an automated livestock feeding apparatus having a plurality of magnetic tags each respectively suspended from a specific animal and having a specific code in the feeder which is detected by a plurality of spaced apart reed switches. The farmer programs the feeding apparatus such that when the sensor reads the magnetic tag around the animal's neck, the feeding apparatus will dispense a ration of fodder specific to that tag. The Monroe Patent is designed for very large livestock and not for small pets.

2. U.S. Pat. No. 4,655,170 issued to Daniel R. DaSilva on Apr. 7, 1987 for "Animal Identification Feed Control System" (hereafter the "DaSilva Patent");

The DaSilva Patent is an involved device which discloses how to deliver a predetermined amount of feed to the livestock, with a readout for animal record keeping and system review. The DaSilva Patent is designed for very large livestock and not for small pets.

3. U.S. Pat. No. 5,570,655 issued to Anthony Targa on Nov. 5, 1996 for "Device For Controlling Animal Access To A Location" (hereafter the "Targa Patent");

The Targa Patent prevents an animal from eating from the food bowl, by having that animal trigger an alarm or loud noise that frightens it away.

4. U.S. Pat. No. 5,669,328 issued to Tammy Lanfranchi on Sep. 23, 1997 for "Automatic Animal Feeding System" (hereafter the "Lanfranchi Patent");

The Lanfranchi Patent teaches a very different structure, having a covered food dish with a triangular top with a closeable opening of sufficient size to allow an animal's head to enter to get access to the food dish. The animal that is permitted to eat from the dish wears a collar with a transceiver. When the animal comes in proximity of the dish, mating sensor receives recognition from the transmitter and causes the triangular top to rotate so that the opening becomes uncovered to allow the animal to eat.

5. U.S. Pat. No. 6,044,795 issued to Taketoshi Matsuura et al. and assigned to Matsushita Electronics Corporation on Apr. 4, 2000 for "Automatic Feeding System Having Animal Carried Transmitter Which Transmits Feeding Instructions To Feeder" (hereafter the "Matsuura Patent");

The Matsuura Patent is a food delivery system which dispenses a pre-programmed quantity of food into a feed bowl when it senses the animal's transmitter. The transmitter is implanted in the body of the animal.

6. U.S. Pat. No. 6,349,671 issued to Nan R. W. Lewis et al. on Feb. 26, 2002 for "Pet Feeding System And Method Of Using Same" (hereafter the "Lewis Patent");

The Lewis Patent discloses four separate covered dishes with activation mechanisms that are programmed so that the dishes can open when the cat wearing a transmitter tag, which generates a radio signal, comes in proximity of the dish. The food dish is kept inaccessible to all animals until the desired cat's transmitter comes in proximity to the signal transceiver causing the food dish to open to allow the cat to eat.

7. United States Published Patent Application No. 2002/0134313 to Robert Andrew King on Sep. 26, 2002 for "System, Method And Apparatus For Controlling Animal Feeding" (hereafter the "King Published Patent Application");

The King Published Patent Application discloses a covered feed dish that opens when it receives a radio signal from a transmitter on the animal. The feeding method can be programmed to not open except during certain hours. This transmitter may be implanted on the animal or permanently affixed to the animal, and may transmit data to the transceiver, such as whether the animal has eaten that day already. The covered feed dish includes a temperature control device to prevent spoilage and a spray device to chase animals away from the dish.

8. U.S. Pat. No. 6,651,584 issued to Karel van den Berg and assigned to Lely Research Holding A.G. on Nov. 25, 2003 for "Feed Metering And Animal Identification Device With Load Sensor And Closing Means" (hereafter the "'584 van den Berg Patent");

The '584 van den Berg Patent discloses a feed metering device for distributing feed in metered portions to an animal. Based on information received from the animal's ID tag, the device weighs the fodder or drink and delivers a specific quantity of either food or drink to the animal. The device also monitors the amount of food the animal eats and how much fodder is left in the device.

9. United States Published Patent Application No. 2005/0061252 to Glenn Meeks et al. on Mar. 24, 2005 for "Pet Feeding Dish And Method" (hereafter the "Meeks Published Patent Application");

The Meeks Published Patent Application discloses a pet feeding system wherein the system uses pulse width identification to provide a more effective identification of a unique signal from a remote circuit a pet tag. Utilizing a sophisticated digital circuit, the device is capable of identifying more than one remote circuit such as two or more pets at the same time. A hopper holds extra food that is meted out and a flap will rise to allow the animal to eat.

10. U.S. Pat. No. 6,907,843 issued to Karel van den Berg and assigned to Lely Research Holding AG on Jun. 21, 2005 for "Feed Metering And Animal Identification Device With Load Sensor And Closing Means" (hereafter the "'843 van den Berg Patent");

The '843 van den Berg Patent is the same patent as the '584 van den Berg Patent, discussed above, but is a divisional application having different claims of invention with respect to the device.

11. United States Published Patent Application No. 2005/0217591 to Robert Michael Turner on Oct. 6, 2005 for "Animal Feeding Device And Method" (hereafter the "Turner Published Patent Application");

The Turner Published Patent Application discloses a hopper that is programmed to deliver a specific quantity of food based on information it receives from the animal's transmitter. This device maintains specific feeding schedules and specific diets for animals.

12. U.S. Pat. No. 7,051,674 issued to Karel van den Berg and assigned to Lely Research Holding AG on May 30, 2006 for "Feed Metering Device" (hereafter the "'674 van den Berg Patent");

The '674 van den Berg Patent is again another division of the previously discussed '584 van den Berg Patent having different claims of invention on the same concept.

13. U.S. Pat. No. 7,100,534 issued to Karel van den Berg and assigned to Lely Research Holding AG on Sep. 5, 2006 for "Feed Metering And Animal Identification Device Having Angularly Displaceable Weighing Means" (hereafter the "'534 van den Berg Patent");

The '534 van den Berg Patent is again another patent which has the same concept as '584 van den Berg Patent but with different claims of invention.

14. U.S. Pat. No. 7,124,707 issued to Jennifer Ann Clarke on Oct. 24, 2006 for "Selective Animal Feeding Apparatus" (hereafter the "Clarke Patent").

The Clark Patent discloses the ability to have selective food access to a specific animal wearing a continuously emitting transmitter.

While the prior art has feeder devices for livestock have magnetic tags, those feeders and large, bulky, require programming and have expensive and delicate electronics. Prior art feeder devices for small domesticated pets also have expensive and delicate electronics. The use of these electronics is a significant problem. The relative fragility and expense of these electronics subject the equipment to frequent breakages, repairs, maintenance, and replacements. Additionally, all the prior art are designed to not allow access unless and until the right animal approaches, which means that if any of the electronics break down or are programmed incorrectly, no animal gets any food because the electronics will not dispense any food or allow any access if the electronics breaks down. Pet owners are not pleased at the constant expense for repairs and replacements nor at coming home to find that their pet has not had any food all day or all weekend.

There exists a need for a pet feeder that allows access to food unless and until an animal that should not partake of the food in the feeder approaches. There exists a need for a restricted access pet feeder that has the ability to adjust to the height and size of the animal, so as to grow with the animal. There exists a need for a restricted access pet feeder that has the ability to adjust the size of the opening where the food is. There exists a need for a restricted access pet feeder that eliminates expense and delicate electronic parts. There exists a need for a restricted access pet feeder that eliminates the necessity of having wireless transmitters which are much more expensive which is what most of the cat dishes have. There exists a need for a restricted access pet feeder for small animals that does not use transmitters or transceivers, or other devices which add to the expense and cost of manufacture, production, sales, and repairs of animal feeders.

SUMMARY OF THE INVENTION

The present invention solves the problems of the prior art. The present invention does not utilize microprocessors, transmitters, transceivers or other delicate electronics. The present invention is designed with simplicity for small domesticated animals, with only one, seldom moving part. The present invention will not cause an animal to starve if the electronics break or fail. The present invention is inexpensive to manufacture and purchase and can be highly decorative.

The present invention is a novel device having two primary components. The first is a specialized collar and the second is a feeder. The specialized collar has a pendant from which hangs two magnets. The first magnet is weaker than the second magnet and is permanently affixed to the pendant. The second magnet is stronger than the first magnet and is affixed to the pendant by its magnetic attraction to the first magnet. This allows an animal wearing the specialized collar to release itself should the animal become magnetically attached to a fixed object, such as a refrigerator. The animal's natural pull will separate the first and second magnet from each other and release the animal. The second magnet will remain magnetically attached to the object until removed, after which the second magnet is preferably re-attached to the first magnet on the pendant of the specialized collar. This specialized collar is placed on the animal that should not eat from the feeder.

The feeder is preferably adjustable in height and head-width or available in various heights and head-widths. The feeder has an area in which the pet food is placed. The feeder has a magnetic sensor which is placed in a location so as to sense either the first magnet, the second magnet, or both magnets on the pendant of the specialized collar. When the feeder senses the magnets of the specialized collar, the internal circuitry causes the feeder to vibrate and make noise, thus frightening the animal away from the food. Because the specialized collar is placed on the animal that should not eat from the feeder, the feeder will sense the near presence of this animal and prevent this animal from eating the food in the dish by vibrating the feeder and making a disturbing noise. When the animal with the specialized collar moves away from the feeder, the feeder no longer senses the magnets of the specialized collar and the internal mechanisms stop the vibrations and noise, thereby allowing an animal without the specialized collar to enjoy the food.

A preferred embodiment of the present invention requires the animal to approach and eat from the feeder by stepping on a raised platform. It is under this platform that the vibration causing motors reside. The animal must step onto this platform to eat. If the animal on the platform has the specialized collar, then the sensor will detect the magnets on the collar and cause the platform to vibrate and make noise.

In an alternate embodiment, there is no platform and the vibration causing motors reside within the tower-housing of the feeder. The feeder is designed so that there is only one direction from which the food may be eaten and thus the sensors are located to sense the magnets in the specialized collar. When sensed, the vibratory motors will vibrate the entire housing and disturb the animal. The vibratory motors also vibrate the shield surrounding the food area which is of a size such that the whiskers, fur or body of the animal will also vibrate and disturb the animal so as to discourage or train the animal not to eat from the feeder. Additional ticklers can be added to the interior of the shield in locations to further disturb the whiskers, fur or body of the animal.

Because the internal circuitry closes only when the specialized collar is in close proximity, power to the feeder is kept at an extreme minimum. The feeder has an on/off switch so that the access restriction can be turned off and the feeder can be used for all feeding purposes.

First, it is an object to provide an animal feeder restricting access to the food which provides access for small domesticated pets. The present invention provides this feature.

Second, it is an object of the invention to provide an animal feeder restricting access to the food which activates only to disallow access of an animal to the food within the feeder. The present invention provides this feature.

Third, it is an object of the invention to provide an animal feeder restricting access to the food, which is adjustable in its height to correspond to the height of the specific animal anticipated to eat from the feeder. The present invention provides this feature.

Fourth, it is an object of the invention to provide an animal feeder restricting access to the food with an adjustable opening to allow a specific sized head to enter into the eating area so as to customize the feeder for a specific animal and to prevent animals with larger heads from being able to enter their heads in the eating area. The present invention provides these features.

Fifth, it is an object of the invention to provide an animal feeder restricting access to the food which is resilient to animal damage and abuse. The present invention provides this feature.

Sixth, it is an object of the invention to provide an animal feeder restricting access to the food, which is small, portable and easy to clean and care for. The present invention provides these features.

Seventh, it is an object of the invention to provide an animal feeder restricting access to the food, which is simple. The present invention is very simple to use, simple to manufacture, simple to repair, as well as convenient and easy to use.

Eight, it is an object of the invention to provide an animal feeder restricting access to the food, which is inexpensive to manufacture and eliminates parts in the prior art. Prior art devices are complex, with multiple, varied contents, such as microprocessors, transmitters, transceivers, tracking devices, programmable devices, recording devices, digital memory, etc., all requiring varied systems of manufacture. Additionally, prior art that contains a multiplicity of parts, as well as complicated apparatuses disguised as another item are expensive to manufacture. The present invention eliminates parts in the prior art and is easy and inexpensive to manufacture since the main body is only one molded or formed piece.

Ninth, it is an object of the invention to provide an animal feeder restricting access to the food, which is inexpensive to purchase. Due to the size, simplicity and uncomplicated nature of the present invention, the present invention will be inexpensive.

Tenth, it is an object of the invention to provide an animal feeder restricting access to the food employing a simple circuit utilizing a magnetic switch, which is animal appropriate. Restricted access feeders for animals exist in the prior art, but do not take into consideration the size and needs of small domesticated animals, or more specifically, small cats, small dogs, kittens or puppies. The present invention is able to fit a particular small animal and can withstand being pushed or knocked against by small animals without damage to the circuitry or the body of the feeder. The present invention is animal appropriate with a hardy design.

Eleventh, it is an object of the invention to provide an animal feeder restricting access to the food which is durable. Feeders for livestock and domesticated pets which are made with microprocessors, transmitters, transceivers or which have many moving parts or parts that move frequently are fragile and will not last as long as feeders which do not contain sophisticated electronic devices or which have movement which is the exception to access rather than the requirement to access, thus requiring movement every time access is required. The present invention is durable.

Twelfth, it is an object of the invention to provide an animal feeder restricting access to the food which is durable, which is small and portable. Animal feeders for storage and display devices which are designed to be hung on the wall or which are large and disguised as another item are not portable. Portability offers the advantage of flexibility of placement. The present invention is small and easily portable.

Thirteenth, it is an object of the invention to provide an animal feeder restricting access to the food which is marketable. With the rise in the pet health care, pet obesity, and increased awareness of animal needs, pet owners have become very active and very knowledgeable about the proper care and feeding of their pets. Marketing slogans and packaging directed at veterinarians, kennels, pet hospitals, pet hotels, and pet would be very effective and salable. Additionally, there is an endless market for the present invention, as the pet population continues to grow and people continue to care and pamper their pets. The present invention is salable, marketable and has an endless, non-seasonable market.

Fourteenth, it is an object of the invention to provide an animal feeder restricting access to the food which is novel. While other patents for restricted access animal feeders exist, the present invention device has several novel features, one of which is having the food area accessible by all animals, unless and until an animal that should not eat the food, approaches the animal feeder, so that if the electronics fail, the food is still available to the animal and the animals will not go hungry. Another novel feature is the release mechanism on the magnetic collar, which allows an animal to detach itself from an object, such as a refrigerator, should the magnet on the animal's collar become attracted and attached to the object. The present invention is unique and novel over other animal feeders.

Fifteenth, it is an object of the invention to provide an animal feeder restricting access to the food that is appealing and desirable so that someone who sees one demonstrated by another person will want one too. The animal feeder of the present invention easily lends itself to decorative colors, designs, images, advertising and customization. Veterinarians and pet owners may place the animal feeder in locations that not only are practical and demonstrate the unique and novel functions and features of the animal feeder, but also display the decorative or advertising nature of the animal feeder. Other pet owners may see the animal feeders of their friends and envisage the very cute and customizable possibilities. The present invention is appealing and desirable.

Sixteenth, it is an object of the invention to provide an animal feeder restricting access to the food that is lightweight and small. Prior art devices are large, bulky and heavy. Kennel owners, veterinarians, and pet owners need to feed their animals at least once, if not more often a day. The prior art illustrates feeders that are heavy, bulky and too cumbersome to carry and clean. The present invention is made from a light weight molded plastic or polymer and the internal mechanisms are as simple and light weight as possible. Furthermore, the small and light weight nature allows the restricted access animal feeder to be located anywhere or easily tucked away. The present invention is lightweight, small and compact.

Seventeenth, it is an object to provide an animal feeder restricting access to the food which is reliable, reusable, operable, of good quality and useful in its own right. The use of the invention does not depend on others. The quality is high; the product is inexpensive, but not cheap. It is consistent, easy to operate and can be used again and again. The present invention has all of these features.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Referring to FIGS. 1 through 5, there is illustrated a restricted access animal feeder 10. The restricted access animal feeder 10 has two primary components: a feeder 30 and an activation mechanism 20.

Figure 3:
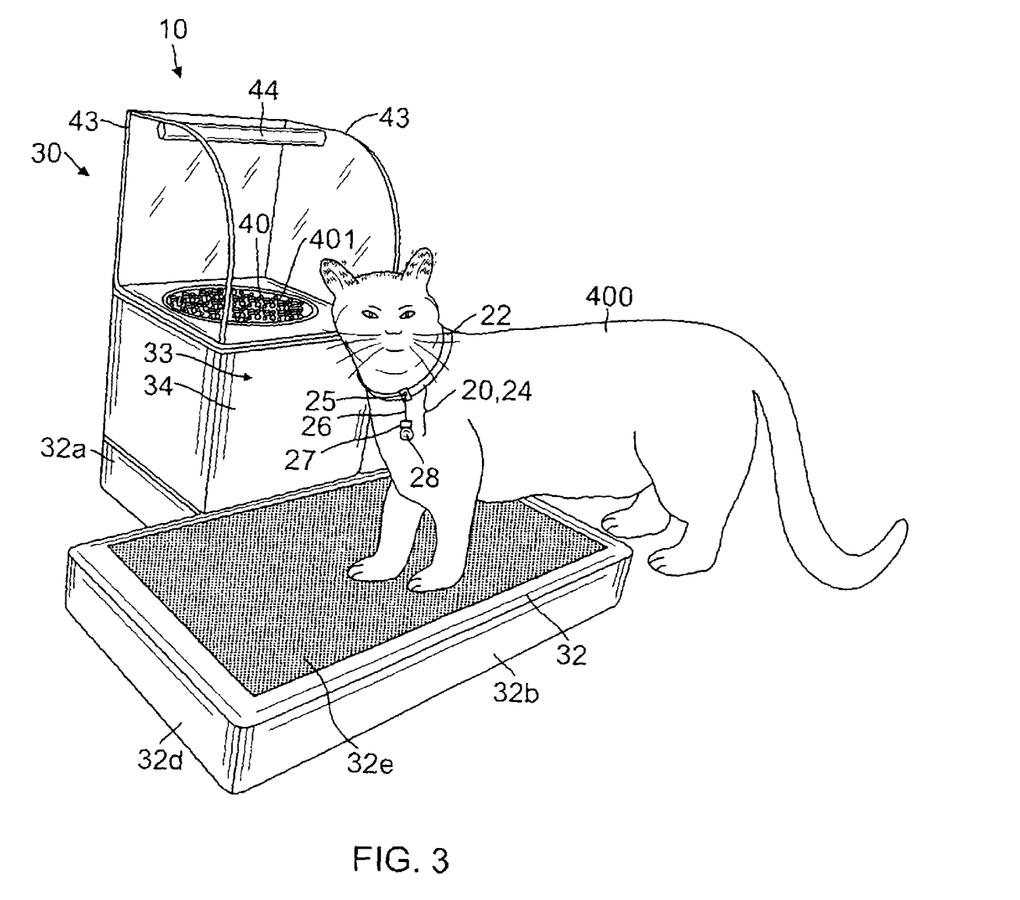
FIG. 3 is a depiction of use of a preferred embodiment of the present invention illustrating a front perspective view of the feeder apparatus and a front perspective view of the collar around the neck of an animal at a distance at which the feeder apparatus is about to sense the magnets on the collar.

The activation mechanism 20 can take many forms but is illustrated here as a pendant 24 that hangs from a collar 22 by a suspension means 26. The pendant 24 is attached to the collar 22 by an affixation means 25 which preferably slides along the collar 22. At the free end of the pendant 24 are a first magnet 27 and a second magnet 28. First magnet 27 is preferably permanently affixed to the suspension means 26. Second magnet 28 is releasably attached to first magnet 27 by their respective attractive magnetic forces. First magnet 27 and second magnet 28 have magnetic forces that are strong enough to allow activation mechanism 20 to function operationally, but weak enough to detach from each other based on the pull of the animal. Should the second magnet 28 become attracted to and held by some other metal object, the animal may detach itself from this object, thus leaving the second magnet 28 attached to the metal object. While the activation mechanism 20 works best with both first magnet 27 and second magnet 28 in place, it may still function operationally with only first magnet 27.

Figure 1:
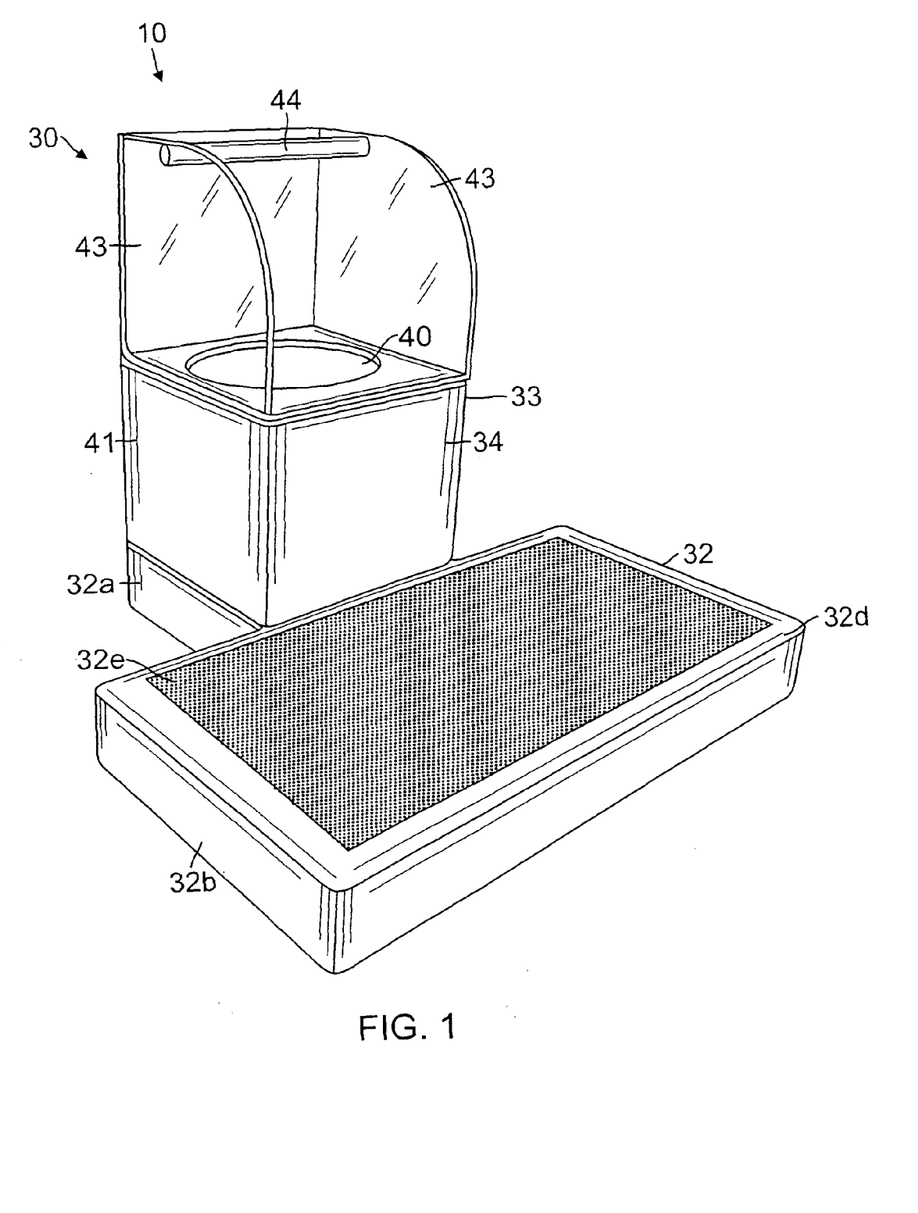
FIG. 1 is a front perspective view of a preferred embodiment of the present invention illustrating the feeder apparatus and its vibrating platform.
Figure 2:
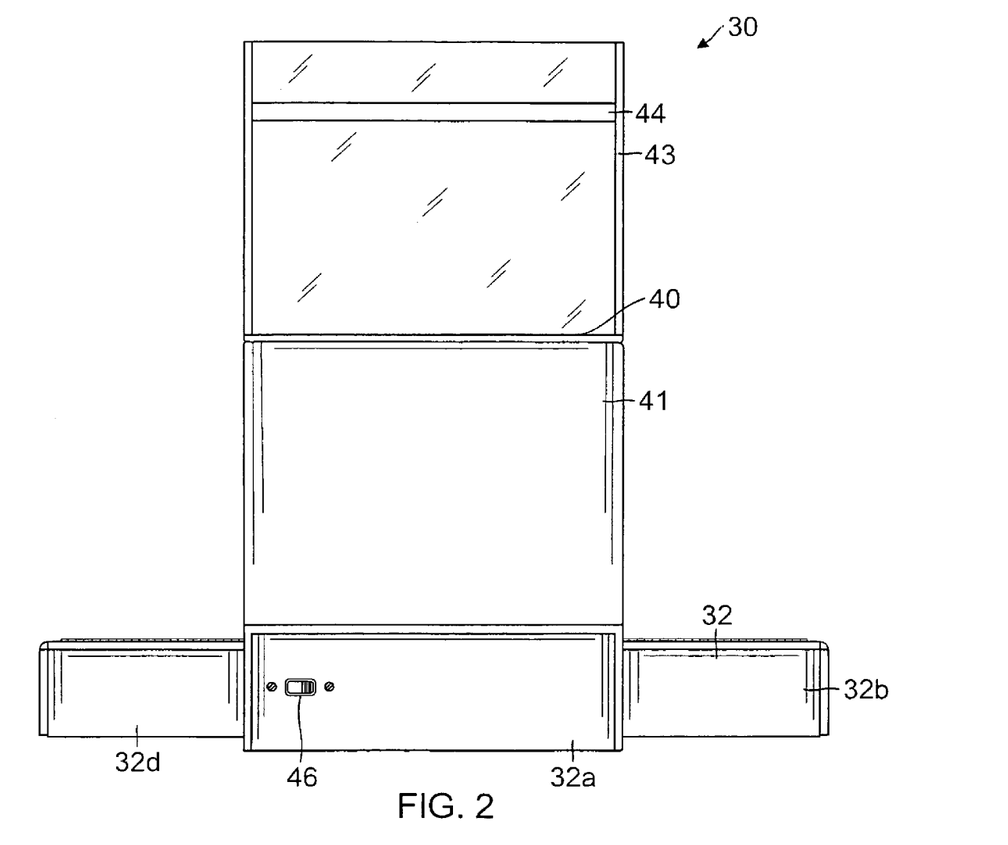
FIG. 2 is a rear elevational view of a preferred embodiment of the present invention illustrating the feeder apparatus.

Feeder 30 has a tower 41 which sets the height for an eating area 40, which resides on a portion of a platform 32. The tower 41 provides general support for the structure and for such items as a feed bowl 401 and shield 43.

Figure 5:
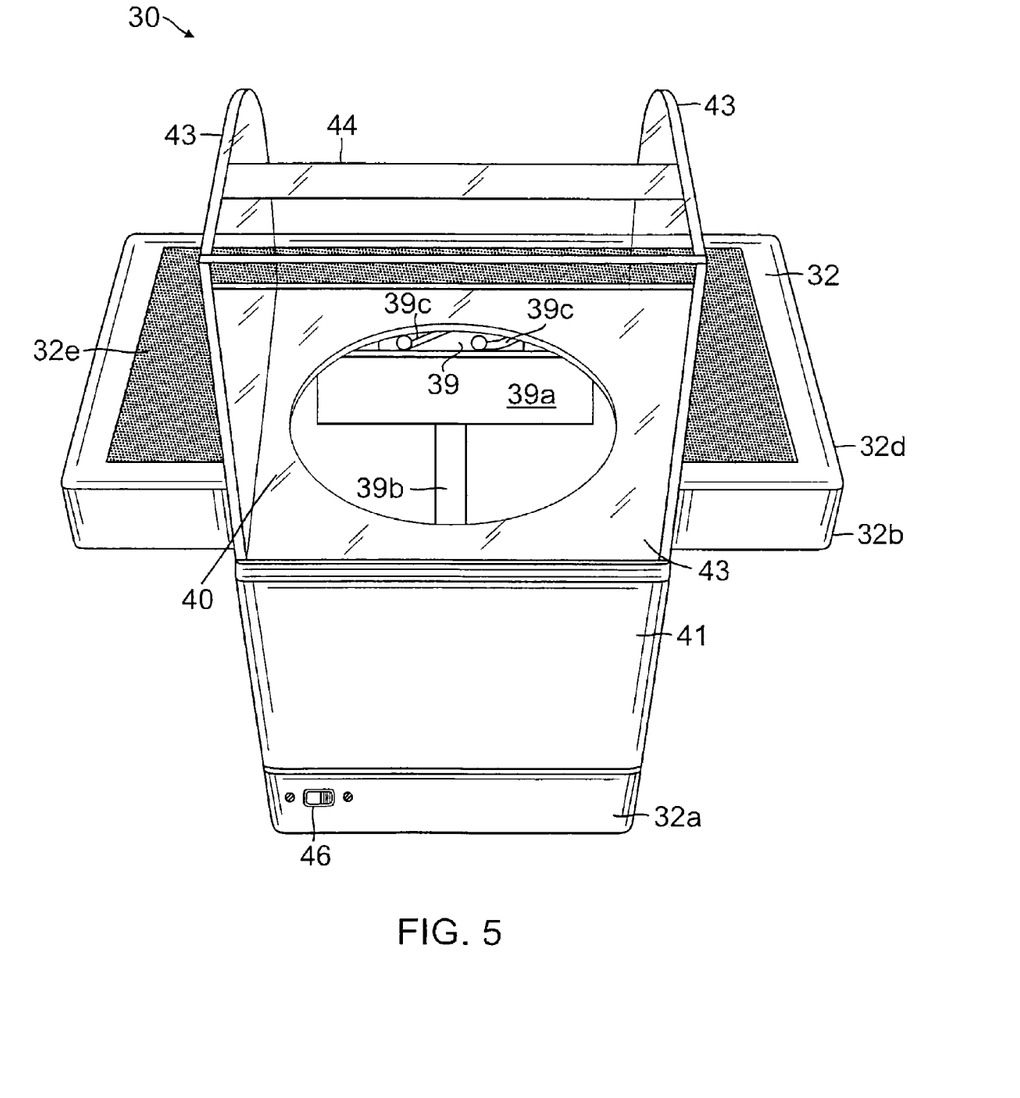
FIG. 5 is a rear perspective view of a preferred embodiment of the present invention having the bowl of food removed so as to further illustrate the location of the magnetic sensor.

The eating area 40 is surrounded on at least three of its perimeter sides by a shield 43. Additionally, a support bar 44 near the top of the open area above the eating area 40 adds cross support to the sidewalls of the shield 43. The shield 43 prevents an animal from eating from the sides of the eating area, and the support bar 44 has the added benefit of preventing an animal from eating from the top of the eating area. Thus, the shield 43 and the support bar 44 provide that the only approach an animal may make to the eating area 40 is from the front 33 of the feeder 30. Because the eating area 40 is only approachable from the front due to the position of the shield 43 and the support bar 44, an animal 400 must place its head and neck in only one location, from only one direction, in order to reach the feed bowl 401 and eat. Due to the forced directional approach to the food bowl 401, when the animal 400 approaches the eating area 40, the pendant 24 on the collar 22 of the animal will be in close proximity to the front wall 34 of the feeder 30. Accordingly, near the eating area 40 and along the front wall 34 is a sensor 39. Sensor 39 is located in a position in the front of feeder 33 area on the front wall 34 in a manner that enables it to sense the pendant 24 on the collar 22 around the neck of an animal 400. In particular, the sensor 39 senses either first magnet 27, second magnet 28, or both. The width of the shield 43 is preferably adjustable to accommodate a variety of animals and animals with large or small faces. The front wall 34 of the feeder 30 is preferably adjustable in height so as to accommodate, for example, a kitten as well as a full grown cat. Likewise, the sensor 39 may also be adjustable so as to properly sense the pendant 24 hanging from the collar 22 of a short animal or a tall animal.

Figure 4:
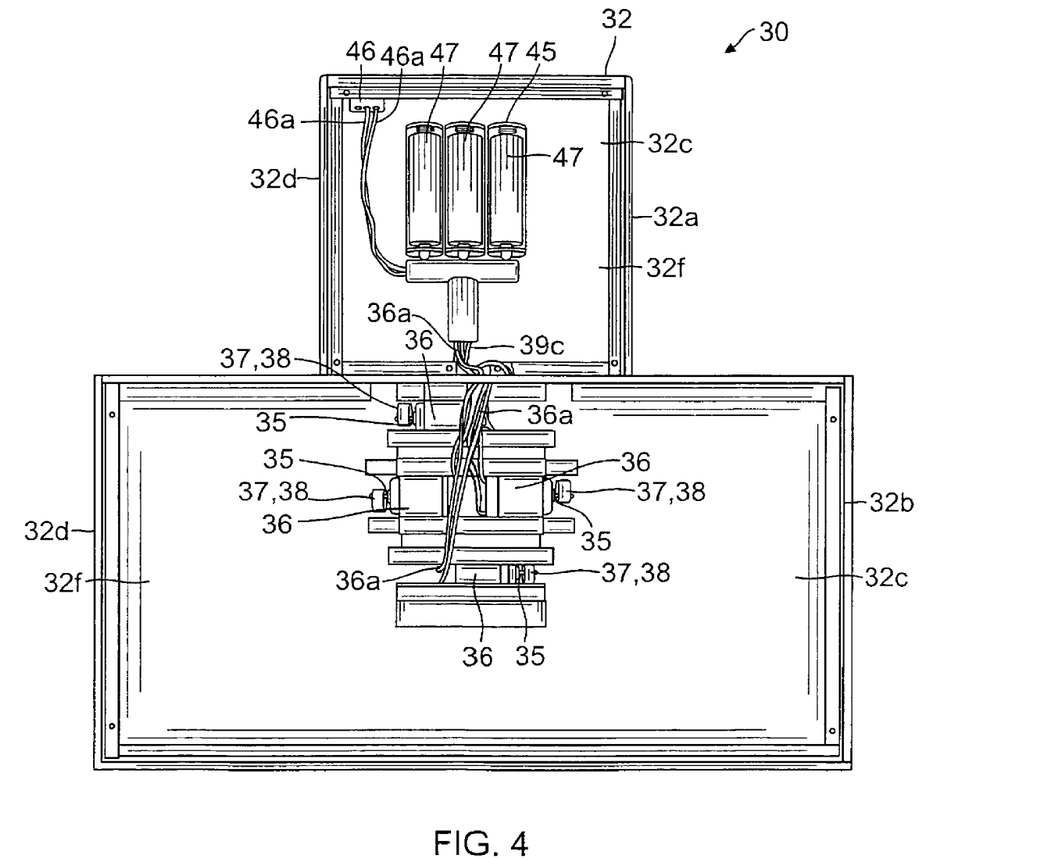
FIG. 4 is a bottom elevational view of a preferred embodiment of the present invention with the bottom plate removed so as to illustrate the interior mechanisms including the several vibration and noise generating motors and the corresponding power supply.

The platform 32 is a T-shaped device, which can be made of the same or different material as that of the tower, and has an interior 32c and an exterior 32d. The vertical portion 32a of the T-shaped platform 32 is of a dimension to accommodate the perimeter of the tower 41 of the feeder 30. The horizontal portion 32b of the T-shaped platform 32 may have an additional textured area 32e, upon which the animal 400 steps or stands when approaching or eating at the eating area 40. The at least one electric motor 36 resides within the interior 32c of the platform 32 and preferably on the ceiling 32f of the interior 32c of the horizontal portion 32b of the platform 32. This places the vibratory mechanism 37 directly under the feet of the animal 400 when it steps on the platform 32. The at least one electric motor 36 is electrically connected to the power supply 45. The power supply 45 is located in the vertical portion 32a of the platform 32. The sensor wires 39c from the sensor 39 pass through the ceiling 32f of the platform 32 to electrically connect to the power supply 45. The on/off wires 46a electrically connect the on/off switch 46 to the power supply 45. The power supply 45 is electrically connected to the at least one electrical motor 36 by the electric motors' wires 36a. The power supply 45 may take many forms, but is here preferred as three AA batteries 47.

Sensor 39 is a magnetic switch which is normally open and electrically connected to at least one electric motor 36, which is located within the platform 32 and a power supply 45. The sensor 39 is located along the front wall 34 of the tower 41 and is protected from the open portion of the eating area 40 by a cover 39a. The wires connecting the sensor 39 to the at least one electric motor 36 are also protected in the tower 41 by a wire cover 39b. The magnets 27, 28 are the actuators to close the switch of the sensor 39 when the magnets 27, 28 are within the sensitivity distance of the sensor 39. When either magnet 27 or magnet 28 or both are in the near presence of sensor 39, the magnets 27, 28 will cause a magnetic switch of the sensor 39 to close the circuit to the at least one electric motor 36. The internal circuits are designed so that when the sensor 39 detects the pendant 24, the circuit is closed and the at least one electric motor 36 begins to run. The at least one electric motor 36 is operationally connected to a vibratory mechanism 37. This vibratory mechanism 37 also generates a disturbing noise. While there are many configurations and quantities of motors and vibrators and noise makers, the preferred embodiment has a total of four small electric motors 36, each rotating a small solid or weighted circular cylinder 38 that is positioned off-center on the electric motor's 36 rotating pole 35. The preferred embodiment of the present invention has the electric motors 36 configured or aligned so that half of the total number of weighted circular cylinders 38 are rotating in the opposite direction with respect to the other half. Having some of the weighted circular cylinders 38 rotating in an opposite direction with respect to the rotation of the other weighted circular cylinders 38 maximizes the vibration generated by these off-set weighted circular cylinders 38, as well as the noise. The vibration and/or noise generated by the vibratory mechanisms will bother or frighten the animal away and thereby prevent the animal from eating from the restricted access feeder 10, and allowing any animal not wearing the pendant 24 to eat from the feed bowl 401.

The circuits for the electric motors 36 are designed in a manner that the circuit has two places where the circuit can be open. The first is at the magnetic switch of the sensor 39, which is activated by magnets 27 and 28 of the pendant 24. The default or normal condition for the magnetic switch of the sensor 39 is open. The second location in the circuit where the circuit may be opened is at an on/off switch 46. When the on/off switch is placed in the on position, the circuit awaits the closing of the magnetic switch of the sensor 39 to close and thereby supply power to the at least one electric motor 36. Because the power supply 45 is only used when the circuit is fully closed at both the on/off switch 46 and at the sensor 39, the power supply is minimally used and power conservation is maximized.

Figure 6:
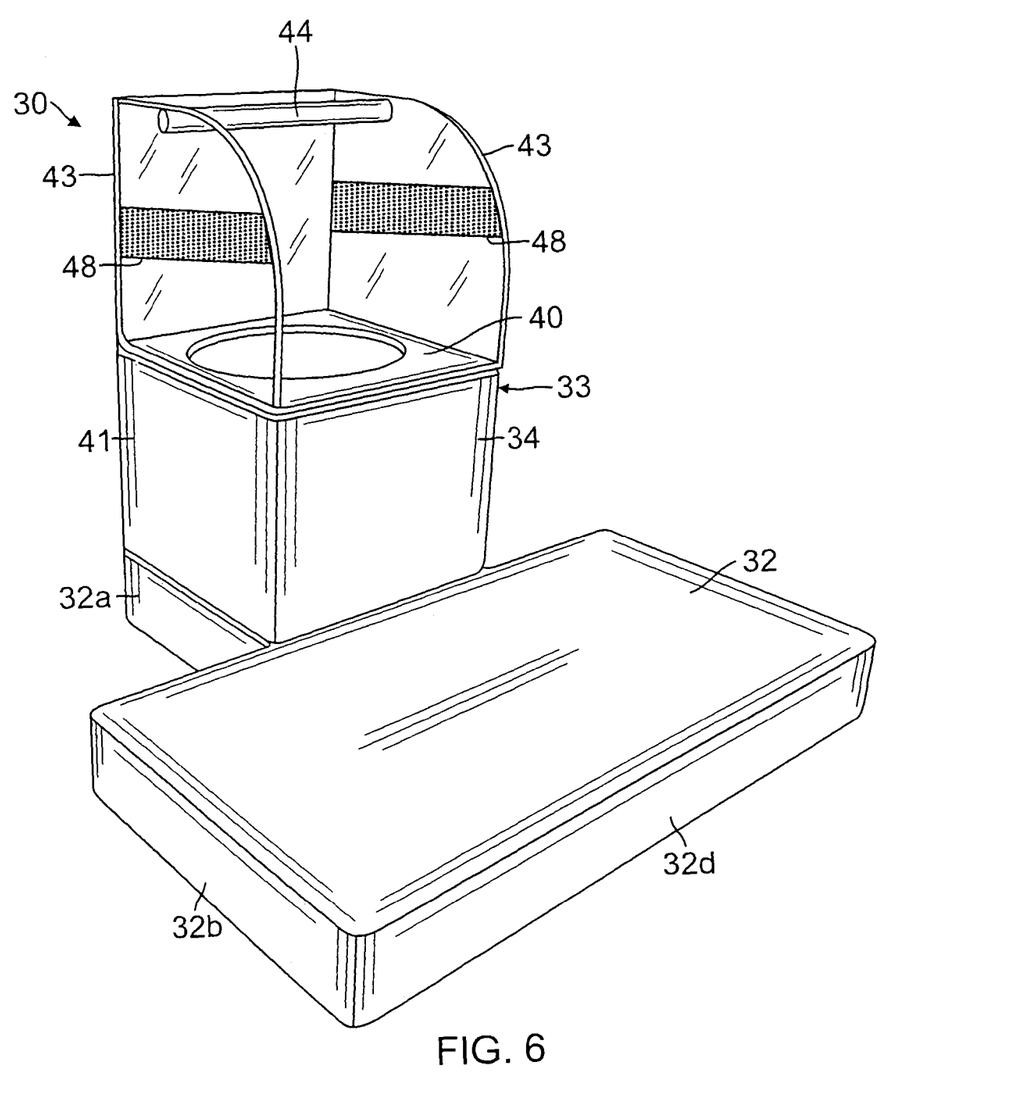
FIG. 6 is a front perspective view of an alternate embodiment of the present invention having an additional optional element of the back cover removed so as to illustrate the interior configuration and mechanisms of the feeder apparatus when the feeder apparatus is in restricted access mode.

In referring to FIG. 6, there is illustrated the feeder 30 with an optional and additional tickler 48 arranged on at least one side of the interior of the shield 43 so as to disturb the whiskers, fur or body of an animal 400. FIG. 6 also illustrates the feeder 30 without the textured area 32e on its platform 32, as this is an optional feature and the feeder 30 may operationally function without it.

An alternate embodiment, not shown, is substantially the same as the preferred embodiment, but has eliminated the platform portion of the feeder. Instead the tower is greater in height to compensate for the height the platform would have added to the alternate embodiment and the power supply, the at least one electric motor, and the vibratory mechanisms are all located within the tower. The vibratory mechanism is mounted along at least one interior wall of the tower so as to maximize the vibration and noise. All other features, novelties, and mechanisms of the alternate embodiment are substantially the same as that of the preferred invention.

Defined in detail, the present invention is a restricted access animal feeder, comprising: (a) an activation means comprising a pendant that hangs from a collar worn by an animal, the pendant affixed to the collar by affixation means, the pendant retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet; (b) a feeder comprising a housing having a means for retaining animal food, shield means to enable access to the food retaining means from only one location, adjustment means to enable the height of the means for retaining food to be raised or lowered, adjustment means to enable an area between the shield and the food retaining means to be increased or decreased, a platform adjacent the housing and positioned adjacent to the location where there is access to the food retaining means, a source of vibration operationally connected to the platform, the source of vibration connected to at least one electric motor which in turn is connected to a power supply which is connected to a magnetic switch; and (c) the housing having magnetic sensor means which is activated when the pendant having the two magnets is adjacent the housing, the sensor means causing the magnetic switch connected to the power supply to close which activates the at least one electric motor which causes the source of vibration to generate vibratory motion of the platform and also generate a disturbing noise.

Defined more broadly, the present invention is a restricted access animal feeder, comprising: (a) an activation means comprising an attachment to a collar worn by an animal, the attached retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet; (b) a feeder comprising a housing having a means for retaining animal food, shield means to enable access to the food retaining means from only one location, a source of vibration operationally connected to the housing, the source of vibration connected to at least one electric motor which in turn is connected to a power supply which is connected to a magnetic switch; and (c) the housing having magnetic sensor means which is activated when the pendant having the two magnets is adjacent the housing, the sensor means causing the magnetic switch connected to the power supply to close which activates the at least one electric motor which causes the source of vibration to generate vibratory motion of the platform.

Defined even more broadly, the present invention is a restricted access animal feeder, comprising: (a) an activation means comprising an attachment to a collar worn by an animal, the attachment retaining at least one permanent magnet; (b) a feeder comprising a housing having a means for retaining animal food, shield means to enable access to the food retaining means from only one location, a source of vibration operationally connected to the housing, the source of vibration connected to at least one electric motor which in turn is connected to a power supply which is connected to a magnetic switch; and (c) the housing having magnetic sensor means which is activated when the pendant having the two magnets is adjacent the housing, the sensor means causing the magnetic switch connected to the power supply to close which activates the at least one electric motor which causes the source of vibration to generate vibratory motion of the platform.

Also defined even more broadly, the present invention is a restricted access animal feeder, comprising: (a) an activation means comprising an attachment to a collar worn by an animal, the attachment retaining at least one permanent magnet; (b) a feeder comprising a housing having a means for retaining animal food, shield means to enable access to the food retaining means from only one location, a platform adjacent the housing and positioned adjacent to the location where there is access to the food retaining means, a source of vibration operationally connected to the platform, the source of vibration connected to at least one electric motor which in turn is connected to a power supply which is connected to a magnetic switch; and (c) the housing having magnetic sensor means which is activated when the pendant having the at least one permanent magnet is adjacent the housing, the sensor means causing the magnetic switch connected to the power supply to close which activates the at least one electric motor which causes the source of vibration to generate vibratory motion of the platform.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

What is claimed is:
1. A restricted access animal feeder, comprising:
   a. an activation means comprising a pendant that hangs from a collar worn by an animal, the pendant affixed to the collar by affixation means, the pendant retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet;
   b. a feeder comprising a housing having a means for retaining animal food, shield means to enable access to the food retaining means from only one location, adjustment means to enable the height of the means for retaining food to be raised or lowered, adjustment means to enable an area between the shield and the food retaining means to be increased or decreased, a platform adjacent the housing and positioned adjacent to the location where there is access to the food retaining means, a source of vibration operationally connected to the platform, the source of vibration connected to at least one electric motor which in turn is connected to a power supply which is connected to a magnetic switch; and
   c. the housing having magnetic sensor means which is activated when the pendant having the two magnets is adjacent the housing, the sensor means causing the magnetic switch connected to the power supply to close which activates the at least one electric motor which causes the source of vibration to generate vibratory motion of the platform and also generate a disturbing noise.

2. A restricted access animal feeder in accordance with claim 1, further comprising:
   a. the platform has an interior and an exterior, the source of vibration resides within the interior of the platform on a ceiling of the interior of the platform so that the source of vibration is directly under the feet of an animal when it steps on the platform.

3. The restricted access animal feeder in accordance with claim 2 wherein the exterior of the platform further comprises a textured area.

4. The restricted access animal feeder in accordance with claim 1 wherein the power supply is further connected to an on-off switch.

5. The restricted access animal feeder in accordance with claim 1 wherein the at least one electric motor further comprises a weighted cylinder that is positioned off-center on the at least one electric motor.

6. The restricted access animal feeder in accordance with claim 1 further comprising a multiplicity of electric motors connected to the source of power, each electric motor having a weighted cylinder that is positioned off-center on its respective electric motor, the electric motors configured so that half of the total number of weighted circular cylinders are rotating in one direction and half of the weighted circular cylinders are rotating in the opposite direction to thereby maximize the vibration generated by these off-set weighted circular cylinders as well as increasing the generated noise.

7. The restricted access animal feeder in accordance with claim 1 wherein:
   a. the at least one electric motor further comprises a circuit designed in a manner that the circuit has two places where the circuit can be open, the first is at the magnetic switch of the sensor; and
   b. the magnetic switch is normally open and the second location in the circuit where the circuit may be opened is at an on/off switch.

8. The restricted access animal feeder in accordance with claim 1 further comprising a tickler on at least one side of the shield so as to disturb whiskers, fur or body of an animal.

9. A restricted access animal feeder, comprising:
   a. an activation means comprising an attachment to a collar worn by an animal, the attached retaining a first permanent magnet which in turn retains a second permanent magnet, the second permanent magnet having a stronger magnetic force than the first permanent magnet so that if the second permanent magnet is attached to an object, a pulling force by the animal will cause the first permanent magnet to be released from the second permanent magnet;
   b. a feeder comprising a housing having a means for retaining animal food, shield means to enable access to the food retaining means from only one location, a source of vibration operationally connected to the housing, the source of vibration connected to at least one electric motor which in turn is connected to a power supply which is connected to a magnetic switch; and
   c. the housing having magnetic sensor means which is activated when the pendant having the two magnets is adjacent the housing, the sensor means causing the magnetic switch connected to the power supply to close which activates the at least one electric motor which causes the source of vibration to generate vibratory motion of the platform.

10. The restricted access animal feeder in accordance with claim 9 further comprising adjustment means to enable the height of the means for retaining food to be raised or lowered.

11. The restricted access animal feeder in accordance with claim 9 further comprising adjustment means to enable an area between the shield and the food retaining means to be increased or decreased.

12. The restricted access animal feeder in accordance with claim 9 wherein the at least one electric motor further comprises a weighted cylinder that is positioned off-center on the at least one electric motor.

13. The restricted access animal feeder in accordance with claim 9 further comprising a multiplicity of electric motors connected to the source of power, each electric motor having a weighted cylinder that is positioned off-center on its respective electric motor, the electric motors configured so that half of the total number of weighted circular cylinders are rotating in one direction and half of the weighted circular cylinders are rotating in the opposite direction to thereby maximize the vibration generated by these off-set weighted circular cylinders.

14. The restricted access animal feeder in accordance with claim 9 wherein:
   a. the at least one electric motor further comprises a circuit designed in a manner that the circuit has two places where the circuit can be open, the first is at the magnetic switch of the sensor; and
   b. the magnetic switch is normally open and the second location in the circuit where the circuit may be opened is at an on/off switch.

15. The restricted access animal feeder in accordance with claim 9 further comprising a tickler on at least one side of the shield so as to disturb whiskers, fur or body of an animal.

* * * * *